UNITED STATES PATENT OFFICE.

CHARLES TATE CROWELL, OF DENVER, COLORADO.

DIELECTRIC COMPOSITION.

SPECIFICATION forming part of Letters Patent No. 361,347, dated April 19, 1887.

Application filed August 27, 1886. Serial No. 212,005. (No specimens.)

*To all whom it may concern:*

Be it known that I, CHARLES TATE CROWELL, a citizen of the United States, residing at Denver, in the county of Arapahoe and State of Colorado, have invented a new and useful Improvement in Dielectric Compositions, of which the following is a specification.

My invention relates to an improvement in insulating compositions adapted for manufacturing flaggings, sewer-pipes, tiles, &c., but especially adapted for the manufacture of undergound conduits for electrical conductors; and it consists in a composition formed of a mixture of sand or marble-dust, pulverized glass, lime, rosin, isinglass, and coal-tar or "unitite," as will be more fully set forth hereinafter.

In order to form my dielectric composition, I take of sand or marble-dust four parts, of pulverized glass one part, of lime two parts, of rosin one part, of isinglass one part, and of coal-tar or of unitite two parts, and mix the same together.

While the composition is in a plastic condition it is molded or formed into the article desired, and when it becomes dry or hardened it forms a very hard substance, which is impervious to water, is a good non-conductor of electricity, and is capable of sustaining a pressure of fifteen thousand pounds to a square inch.

Unitite is a mineral substance found in the Uintah Mountains.

Having thus described my invention, I claim—

1. A composition consisting of a mixture of sand or marble-dust, pulverized glass, lime, rosin, isinglass, and coal-tar or unitite, substantially in the proportions hereinbefore described.

2. As a new article of manufacture, a dielectric conduit composed of sand or marble-dust, pulverized glass, lime, rosin, isinglass, and coal-tar or unitite, substantially in the proportions described.

In testimony that I claim the foregoing as my own I have hereto affixed my signature in presence of two witnesses.

CHARLES TATE CROWELL.

Witnesses:
EUGENE A. STREET,
EDWARD A. RESER.